United States Patent [19]

Franz et al.

[11] 4,154,638
[45] May 15, 1979

[54] COUPLING AGENT FOR BONDING AN ORGANIC POLYMER TO AN INORGANIC SURFACE

[75] Inventors: Helmut Franz; James C. Vanek, both of Pittsburgh, Pa.

[73] Assignee: PPG Industries, Inc., Pittsburgh, Pa.

[21] Appl. No.: 821,938

[22] Filed: Aug. 4, 1977

[51] Int. Cl.² .............................................. C09J 5/00
[52] U.S. Cl. .................... 156/326; 106/287.11; 156/329; 260/429.7; 427/387; 427/419 A; 427/407 A; 427/419 G; 428/425; 428/432
[58] Field of Search ............... 156/106, 314, 307, 326, 156/308, 329, 99; 427/302, 400, 387, 407 A, 399, 419 A, 419 G; 428/420, 447, 425, 539, 432; 65/60 A; 106/287 SB; 260/429.7

[56] References Cited

U.S. PATENT DOCUMENTS

| | | | |
|---|---|---|---|
| 3,186,963 | 6/1965 | Lewis et al. | 260/46.5 |
| 3,321,350 | 5/1967 | Fekete | 156/329 |
| 3,364,059 | 1/1968 | Marzocchi | 260/448.2 B |
| 3,416,950 | 12/1968 | Schrader | 427/399 |
| 3,436,251 | 4/1969 | Rees | 427/387 |
| 3,509,015 | 4/1970 | Wismer et al. | 156/106 |
| 3,524,900 | 8/1970 | Gibbon et al. | 260/825 |
| 3,567,493 | 3/1971 | Wessel | 427/387 |
| 3,706,592 | 12/1972 | Thomson | 427/387 |
| 3,808,077 | 4/1974 | Rieser et al. | 156/102 |
| 3,862,919 | 1/1975 | Nitzsche et al. | 260/185 |

*Primary Examiner*—John T. Goolkasian
*Assistant Examiner*—J. J. Gallagher
*Attorney, Agent, or Firm*—Donna L. Seidel

[57] ABSTRACT

A coupling agent for bonding an organic polymer to an inorganic coating on glass is prepared by the stoichiometric conversion of silicon-functional terminal groups in a multifunctional silane primer into tin-functional terminal groups which have a high affinity for inorganic surfaces such as tin oxide or indium oxide films on glass.

6 Claims, No Drawings

COUPLING AGENT FOR BONDING AN ORGANIC POLYMER TO AN INORGANIC SURFACE

BACKGROUND OF THE INVENTION

1. Field of the Invention

The present invention relates generally to the art of bonding organic polymers to inorganic substrates, and more particularly to the art of bonding an organic polymer to a metal-containing coating on a glass substrate.

2. Description of the Prior Art

U.S. Pat. No. 3,808,077 to Rieser et al discloses that an adhesion promoter may be necessary to adhere a glass ply to polyurethane and suggests the use of various alkoxy silanes such as gamma animopropyl triethoxysilane and N-beta(aminoethyl) gamma aminopropyl trimethoxysilane sold by Union Carbide Corporation as "A-1100" and "A-1120" respectively.

SUMMARY OF THE INVENTION

The present invention involves a method for the stoichiometric conversion of silicon-functional terminal groups in a multifunctional silane primer into metal-functional terminal groups which have a high affinity for inorganic surfaces such as metal-containing films on glass. An aminosilane primer which is useful for enhancing the bonding of a polymer such as polyurethane to glass is condensed with an organometal compound to yield a metal-functional primer which is useful for enchancing the bonding of a polymer such as polyurethane to glass which is coated with a metal-containing film such as tin oxide or indium oxide.

An amino alkoxy silane is mixed with an alkyl tin carboxylate. A condensation reaction proceeds rapidly to completion. The condensation product is dissolved and diluted with a solvent such as isopropanol to prevent polymerization. The modified primer is applied to a metal oxide coated glass surface which is to be laminated to a polyurethane innerlayer in order to enhance the bonding between the coated glass and plastic surfaces.

DETAILED DESCRIPTION OF THE PREFERRED EMBODIMENTS

Amino alkoxy silanes are known to promote adhesion between glass and polyurethane layers in a laminated article. The amino alkoxy silane operates as a coupling agent in the folowing manner. The amino functionality of the molecule interacts with the urethane functional groups of the polymer while the silicon functionality of the molecule interacts with the silica surface of the glass.

However, when the inorganic surface is a metal or metal oxide, such as a tin oxide film on glass, the silane primer exhibits low hydrolytic stability. Under high humidity conditions, delamination appears along the edges between the polymer and the metal-containing surfaces. According to the method of the present invention, silicon-functional groups of the primer are stoichiometrically converted to metal-functional groups with provide particularly strong bonding to a metal oxide coating such as tin oxide or indium oxide.

The amino alkoxy silane may initially have one, two or three alkoxy groups. The silane may be reacted with from one to three equivalents of an organometal compound, preferably an alkyl tin carboxylate, depending on the desired degree of conversion to metal-functional groups. For purposes of the present invention a ratio of 1:2 for the silicon/tin functionality is most preferred for optimum adhesion of a polyurethane innerlayer to a tin oxide coating on glass. That is, most preferably, a trialkoxy aminosilane is reacted with two equivalents of an alkyl tin carboxylate to yield a coupling agent with two tin functional groups per molecular formula unit.

The coupling agents of the present invention are prepared by reacting an amino alkoxy silane, such as gamma aminopropyl triethoxysilane or N-beta (aminoethyl) gamma aminopropyl triethoxysilane, with an alkyl tin carboxylate such as dibutyl tin diacetate. The reaction will proceed spontaneously upon merely stirring the pure liquid tin reactant into the pure liquid silane reactant at ambient temperature. Preferably the ratio of silane to tin reactants is between 1:1 and 1:3, more preferably between 1:2 and 1:3. The condensation reaction is exothermic and proceeds to completion in about one minute or less. The condensation product must be dissolved and diluted immediately in an appropriate solvent such as isopropanol in order to prevent subsequent polymerization reactions which would result in insoluble polymerized products.

The condensation product in solution is suitable for application as a coupling agent at the interface of a polyurethane innerlayer and a tin oxide or indium oxide coating on glass in an assembly to be laminated. The amino-functionality interaction with the urethane functional groups of the polymer is unchanged, while the silicon-functional groups have been replaced with tin-functional groups which provide stronger interaction with the metal oxide resulting in better adhesion to a metal oxide coating. For example, after 10 days of cyclic humidity exposure, the peel strength between a polyurethane innerlayer and a tin oxide coating on glass is less than 5 pli when an unmodified silane coupling agent is used compared with as high as 80 pli when the silane coupling agent is tin-modified. The term "pli" indicates pounds per lineal inch and has a metric conversion factor of $1.75 \times 10^5$ to yield dynes per lineal centimeter.

Suitable silane reactants include, in addition to gamma aminopropyl triethoxysilane and N-beta (aminoethyl) gamma animopropyl trimethoxysilane, other multifunctional silanes, such as halogenated silanes, wherein the functional groups are hydrolyzable and can be converted to metal-functional groups.

In addition to dibutyltin diacetate, the silane coupling agent may also be modified with compounds of zirconium or titanium. The modified coupling agents so formed may be used with metal containing surfaces other than tin or indium oxide, such as cooper and other transition metal oxides. A variety of solvents may be employed so long as the coupling agent is soluble and polymerization is inhibited.

The coupling agents of the present invention are preferably applied to the metal oxide surface prior to lamination with the polymer innerlayer. The coupling agent may be applied in any conventional manner such as spraying, brusing or dip coating.

The present invention will be further understood from the descriptions of specific examples which follow.

EXAMPLE I

N-beta (aminoethyl) gamma aminopropyl trimethoxysilane is mixed in equimolar ratio with dibutyl tin diacetate by stirring the pure liquid tin compound into the pure liquid silane at ambient temperature. An exothermic condensation reaction begins immediately and proceeds to completion in less than one minute. The condensation product is immediately dissolved and diluted to about 1% solids in isopropanol.

A tin oxide coated glass substrate is dip coated with the mono-tin-functional coupling agent prepared above and laminated at 300° F. to a sheet of polyurethane. The laminate is subsequently exposed to cyclic humidity for 10 days. The force required to peel the polymer at a 90° angle is measured. The peel strength is about 15 pli compared with less than 3 pli for a laminate primed with unmodified silane.

EXAMPLE II

N-beta (aminoethyl)gamma aminopropyl trimethoxysilane is reacted with dibutyl tin diacetate as in Example, 1, except that the molar ratio of reactants is 1:1.5. A tin oxide coated glass substrate is treated with the coupling agent prepared above and laminated as in Example I. The laminate is subsequently exposed to cyclic humidity and the peel strength measured as in Exmple I. The peel strength averages about 32 pli.

EXAMPLE III

N-beta (aminoethyl) gamma aminopropyl trimethoxysilane is reacted with dibutyl tin diacetate as in Examples I and II except that the molar ratio of reactants is 1:2. The peel strength for a treated laminate after 10 days exposure to cyclic humidity is 75 pli.

EXAMPLE IV

N-beta (amonoethyl) gamma aminopropyl trimethoxysilane is reacted with dibutyl tin diacetate as in the above Example, except that the molar ratio of reactants is 1:2.5. The peel strength for a treated laminate after 10 days exposure to cyclic humidity is 61 pli.

For the purposes of bonding polyurethane to tin oxide coated glass, the optimum molar ratio of silane to tin reactants appears to be about 1:2. The optimum ratio may vary for other polymeric innerlayers, other metal-containing coatings or other specific reactants. However, the conversion of silicon functional groups to tin or other metal functional groups significantly improves the bonding between the polymeric innerlayer and the coated glass surface.

The above examples are offered only to illustrate the present invention. Various modifications will be apparent to those skilled in the art and are included within the scope of the present invention as defined by the following claims.

We claim:

1. In a method for laminating polyurethane to a surface of a glass sheet, said surface being coated with a metal-containing film, the improvement which comprises employing, at the interface of the polyurethane and coated glass, a coupling agent prepared by the reaction of an amino-functional silane and an organotin compound.

2. The improved method according to claim 1, wherein the metal-containing film is selected from the group consisting of tin oxide and indium oxide.

3. The improved method according to claim 1, wherein the amino-functional silane is selected from the group consisting of N-beta (aminoethyl) gamma aminopropyl trimethoxysilane and gamma aminopropyl triethoxysilane.

4. The improved method according to claim 1, wherein the organometal compound is an alkyl metal carboxylate.

5. The improved method according to claim 4, wherein the alkyl metal carboxylate is dibutyl tin diacetate and the metal-containing film is selected from the group consisting of tin oxide and indium oxide.

6. The improved method according to claim 1, wherein the coupling agent is prepared by the reaction of an amino trialkoxy silane with dibutyl tin diacetate in a molar ratio of from 1:1 to 1:3.

* * * * *